United States Patent
Tokuda et al.

(10) Patent No.: US 11,018,615 B2
(45) Date of Patent: May 25, 2021

(54) MOTOR DRIVE DEVICE AND AIR CONDITIONER

(71) Applicant: Mitsubishi Electric Corporation, Tokyo (JP)

(72) Inventors: Yuta Tokuda, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/614,484

(22) PCT Filed: Aug. 4, 2017

(86) PCT No.: PCT/JP2017/028426
§ 371 (c)(1),
(2) Date: Nov. 18, 2019

(87) PCT Pub. No.: WO2019/026282
PCT Pub. Date: Feb. 7, 2019

(65) Prior Publication Data
US 2020/0204101 A1   Jun. 25, 2020

(51) Int. Cl.
*H02P 27/08* (2006.01)
*H02P 25/03* (2016.01)
*F25B 1/00* (2006.01)

(52) U.S. Cl.
CPC ............... *H02P 27/08* (2013.01); *F25B 1/00* (2013.01); *H02P 25/03* (2016.02)

(58) Field of Classification Search
CPC ...... H02P 1/00; H02P 1/04; H02P 1/12; H02P 1/16; H02P 1/163; H02P 1/18; H02P 1/24; H02P 1/26; H02P 1/28; H02P 1/42; H02P 1/46; H02P 1/465; H02P 3/00; H02P 3/14; H02P 6/00; H02P 7/00; H02P 8/00; H02P 9/00; H02P 11/00; H02P 13/00;
(Continued)

(56) References Cited

U.S. PATENT DOCUMENTS 8,098,035 B2 * 1/2012 Sekimoto ............... H02P 23/30
                                                318/432
10,027,252 B2 * 7/2018 Taniguchi ............... H02P 27/06
10,320,278 B2 * 6/2019 Araki ...................... H02M 1/08
(Continued)

FOREIGN PATENT DOCUMENTS

EP   2 884 203 A1   6/2015
EP   3 018 674 A1   5/2016
(Continued)

OTHER PUBLICATIONS

Extended European Search Report dated Apr. 6, 2020 for the corresponding EP application No. 17920565.3.
(Continued)

*Primary Examiner* — Antony M Paul
(74) *Attorney, Agent, or Firm* — Posz Law Group, PLC

(57) ABSTRACT

A motor drive device includes an inverter to apply power to a motor, and a plurality of relays to switch a connection state of the motor by each switching its state between a first state and a second state. A timing at which at least one of the plurality of relays switches from the first state to the second state is different from a timing at which the other relays switch from the first state to the second state.

10 Claims, 8 Drawing Sheets

(58) Field of Classification Search
CPC .......... H02P 23/00; H02P 27/00; H02P 27/04; H02P 27/06; H02M 5/00; H02M 7/00
USPC .......... 318/400.01, 700, 701, 727, 799, 800, 318/801, 430, 599, 811
See application file for complete search history.

(56) References Cited

U.S. PATENT DOCUMENTS

2015/0168033 A1    6/2015  Yamakawa et al.
2017/0302200 A1*  10/2017  Marcinkiewicz ....... H02M 1/44

FOREIGN PATENT DOCUMENTS

| | | |
|---|---|---|
| JP | 2006-246674 A | 9/2006 |
| JP | 2008-228513 A | 9/2008 |
| JP | 2010-193702 A | 9/2010 |
| JP | 2011-199984 A | 10/2011 |
| WO | 2014/002251 A1 | 1/2014 |

OTHER PUBLICATIONS

International Search Report of the International Searching Authority dated Oct. 24, 2017 for the corresponding International application No. PCT/JP2017/028426 (and English translation).

* cited by examiner

Y CONNECTION

Δ CONNECTION

MOTOR DRIVE DEVICE AND AIR CONDITIONER

CROSS REFERENCE TO RELATED APPLICATION

This application is a U.S. national stage application of International Patent Application No. PCT/JP2017/028426 filed on Aug. 4, 2017, the disclosure of which is incorporated herein by reference.

TECHNICAL FIELD

The present invention relates to a motor drive device for driving a motor and an air conditioner including the motor drive device.

BACKGROUND

An air conditioner adjusts its cooling and heating capacity according to the number of revolutions of a compressor motor, i.e. the rotation speed. In recent years, an Annual Performance Factor (APF) has been used as an energy-saving indicator for home air conditioners. An APF is calculated under five conditions: cooling median, heating median, cooling rated, heating rated, and heating low temperature. Cooling median and heating median represent a low-load region where the motor rotates at low speeds, and cooling rated, heating rated, and heating low temperature represent a high-load region where the motor rotates at high speeds. Low-speed rotation indicates rotation at rotation speeds slower than a predetermined value, and high-speed rotation indicates rotation at rotation speeds higher than the predetermined value. Since an energy-saving indicator is calculated both at low rpm and at high rpm, it is desirable that the motor can be increased in efficiency in a wide rpm region.

As compressor motors, brushless Direct Current (DC) motors using permanent magnets for a rotor for increased efficiency are widely used. When a motor such as a brushless DC motor is used, a method of achieving increased efficiency at low rpm may be a method that reduces inverter loss by increasing winding resistance by increasing the number of turns of the stator windings of the motor, thereby operating the motor with less current.

On the other hand, a method of achieving increased efficiency at high rpm may be a method that reduces winding resistance by reducing the number of turns of the stator windings of the motor to reduce voltage applied to the motor. This makes it difficult for voltage applied to the motor to reach an upper limit value of voltage that can be output by the inverter controlling the motor.

As described above, the number of turns of the stator windings appropriate for achieving increased efficiency at low rpm is different from that at high rpm. For this reason, a connection switching system that switches stator windings between a star connection and a delta connection according to the rotation speed is widely used.

In the connection switching system described above, at the time of switching from the star connection to the delta connection, an inrush current occurs because a voltage difference occurs before and after the switching. In particular, when a motor is star-connected at the start of the motor and then is switched to the delta connection, an inrush current at the time of switching from the star connection to the delta connection may be larger than a current when the motor is started directly with the delta connection. The increase in inrush current may cause electrical trouble. Further, due to the flow of the increased inrush current, mechanical shock at the time of switching from the star connection to the delta connection is greater than when the motor is started directly with the delta connection, and may cause mechanical trouble such as mechanical damage.

Patent Literature 1 discloses a technique for reducing a voltage difference at the time of switching from a star connection to a delta connection. An induction motor controller described in Patent Literature 1 includes a first switch for star-connecting three-phase coils, a second switch for delta-connecting the three-phase coils, and a circuit for boosting a power supply voltage. The induction motor controller described in Patent Literature 1 reduces a voltage difference at the time of switching from the star connection to the delta connection by boosting the power supply voltage such that the voltage of the three-phase coils when a boosted voltage is applied to the star-connected three-phase coils is higher than the voltage of the three-phase coils when the power supply voltage is applied to the star-connected three-phase coils and is lower than the voltage of the three-phase coils when the power supply voltage is applied to the delta-connected three-phase coils.

PATENT LITERATURE

Patent Literature 1: Japanese Patent Application Laid-open No. 2010-193702

However, by the technique described in Patent Literature 1, which uses the two switches to switch the three-phase coils from the star connection to the delta connection, if relays of one type of electromagnetic contactors, for example, are used to switch the three phases simultaneously, an excessive current can flow in a motor drive device driving the motor. Consequently, for example, the output voltage of a power source that supplies power to a control circuit in the motor drive device may vary, the voltage supplied to the control circuit may temporarily decrease, and reset may occur in the control circuit. When the control circuit is reset, control in the motor drive device may not be performed normally, leading to a failure of the apparatus or the like.

SUMMARY

The present invention has been made in view of the above, and its object is to provide a motor drive device capable of reducing variations in current that occur when the connection state of the motor is switched.

In order to solve the above-described problem and achieve the object, a motor drive device according to an aspect of the present invention includes: an inverter to apply power to a motor; and a plurality of switches to switch a connection state of the motor by each switching a state thereof between a first state and a second state. A timing at which at least one of the plurality of switches switches from the first state to the second state is different from a timing at which another of the plurality of switches switches from the first state to the second state.

The motor drive device according to the present invention can advantageously reduce variations in current that occur when the connection state of the motor is switched.

DETAILED DESCRIPTION

Hereinafter, a motor drive device and an air conditioner according to embodiments of the present invention will be described in detail with reference to the drawings. Note that the embodiments are not intended to limit the invention.

First Embodiment

Figure 1:
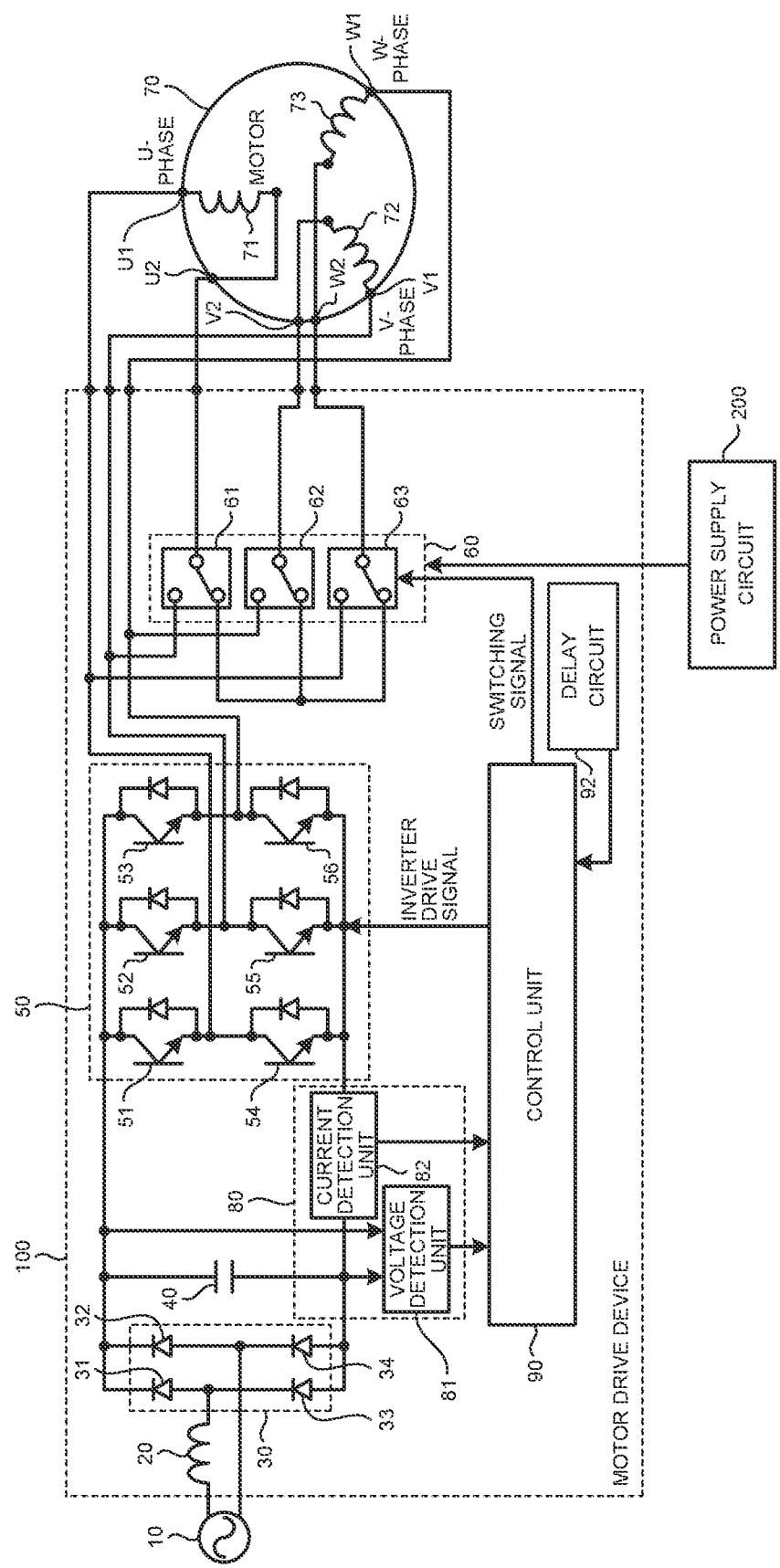
FIG. 1 is a diagram illustrating an example configuration of a motor drive device according to a first embodiment.

FIG. 1 is a diagram illustrating an example configuration of a motor drive device according to a first embodiment of the present invention. A motor drive device 100 of the present embodiment is connected to an AC power source 10, and drives a motor 70. The motor drive device 100 includes a reactor 20, a rectifier unit 30, a capacitor 40, an inverter 50, a switching unit 60, a detection unit 80, and a control unit 90.

The motor 70 is a three-phase motor, and includes a stator winding 71, a stator winding 72, and a stator winding 73 corresponding to the U phase, the V phase, and the W phase, respectively. A terminal U1 and a terminal U2 are provided at both ends of the stator winding 71, a terminal V1 and a terminal V2 are provided at both ends of the stator winding 72, and a terminal W1 and a terminal W2 are provided at both ends of the stator winding 73. As illustrated in FIG. 1, the motor 70 is configured such that the connection state of the windings of the stator can be switched between a star connection and a delta connection by switching the connection state between the stator windings 71, 72, and 73.

The rectifier unit 30 includes rectifier elements 31 to 34 such as diodes. The rectifier unit 30 converts AC power supplied from the AC power source 10 through the reactor 20 into DC power. The capacitor 40 is connected in parallel to the rectifier unit 30, and smooths the DC power output from the rectifier unit 30.

The inverter 50 is connected in parallel to the capacitor 40, and converts the DC power smoothed by the capacitor 40 into power of a desired voltage to be applied to the motor 70 in accordance with an inverter drive signal output from the control unit 90, and applies the power to the motor 70. The inverter 50 includes switching elements 51 to 56 that are a plurality of switching elements. The switching element 51 and the switching element 54 are connected in series, the switching element 52 and the switching element 55 are connected in series, and the switching element 53 and the switching element 56 are connected in series. Hereinafter, a switching element pair composed of the switching element 51 and the switching element 54 is referred to as a U-phase arm, a switching element pair composed of the switching element 52 and the switching element 55 is referred to as a V-phase arm, and a switching element pair composed of the switching element 53 and the switching element 56 is referred to as a W-phase arm.

The detection unit 80 includes a voltage detection unit 81 and a current detection unit 82. The voltage detection unit 81 detects voltage across the capacitor 40, and outputs the detected voltage value to the control unit 90. The current detection unit 82 detects current flowing through the inverter 50, and outputs the detected current value to the control unit 90.

The control unit 90 generates an inverter drive signal for controlling the switching elements 51 to 56 of the inverter 50 by Pulse Width Modulation (PWM) control, using the voltage value detected by the voltage detection unit 81 and the current value detected by the current detection unit 82, and outputs the inverter drive signal to the inverter 50. An inverter drive signal is generally a signal for turning on or off the switching elements 51 to 56. For the PWM control in the control unit 90, a PWM control method in a typical motor drive device can be used, and thus detailed description thereof is omitted. The control unit 90 also generates a switching signal for controlling the switching unit 60, and outputs the switching signal to the switching unit 60. Details of a method of controlling the switching unit 60 in the control unit 90 will be described later.

The switching unit 60 includes relays 61, 62, and 63 that are an example of a plurality of switches. The following describes an example in which the relays 61, 62, and 63 that are change-over-contact relays are used as the switches. However, the switches are not limited to this example, and may be in any form as long as they can switch the connection state between the stator windings 71, 72, and 73, like the relays 61, 62, and 63. That is, the relays 61, 62, and 63 are an example of a plurality of switches. The plurality of switches may be in any form as long as they can switch the connection state of the motor 70 by each switching its state between a first state and a second state.

The terminal U1 of the motor 70 is connected to the midpoint of the U-phase arm and to the relay 63. The terminal U2 is connected to the relay 61. The terminal V1 is connected to the midpoint of the V-phase arm and to the relay 61. The terminal V2 is connected to the relay 62. The terminal W1 is connected to the midpoint of the W-phase arm and to the relay 62. The terminal W2 is connected to the relay 63.

The contacts of the relays 61, 62, and 63 become the off state or the on state according to a switching signal output from the control unit 90. That is, the control unit 90 controls switching of the relays 61, 62, and 63 that are the plurality of switches. The off state is a state in which the contacts of the relays 61, 62, and 63 are in the nonconducting state, and the on state is a state in which the contacts of the relays 61, 62, and 63 are in the conducting state. FIG. 1 illustrates an example in which all of the relays 61, 62, and 63 are in the off state. The switching signal is, for example, a binary signal that takes one of a high level and a low level. The low level indicates turning off and the high level indicates turning on. Correspondences between the values of the switching signal and the states of the contacts of the relays 61, 62, and 63 are not limited to this example.

The relay 61 is connected to the terminal U2 of the motor 70, the midpoint of the V-phase arm, the relay 62, and the relay 63. When the relay 61 is in the off state, the terminal U2 is connected to the relay 62 and the relay 63. When the relay 61 is in the on state, the terminal U2 is connected to the midpoint of the V-phase arm. The relay 62 is connected to the terminal V2 of the motor 70, the midpoint of the W-phase arm, the relay 61, and the relay 63. When the relay 62 is in the off state, the terminal V2 is connected to the relay 61 and the relay 63. When the relay 62 is in the on state, the terminal V2 is connected to the midpoint of the W-phase arm. The relay 63 is connected to the terminal W2 of the motor 70, the midpoint of the U-phase arm, the relay 61, and the relay 62. When the relay 63 is in the off state, the terminal W2 is connected to the relay 61 and the relay 62. When the relay 63 is in the on state, the terminal W2 is connected to the midpoint of the U-phase arm.

With the above configuration, when all of the relays 61, 62, and 63 are in the off state, the terminal U2, the terminal V2, and the terminal W2 are connected and the connection state of the stator of the motor 70 is the star connection.

Figure 2:
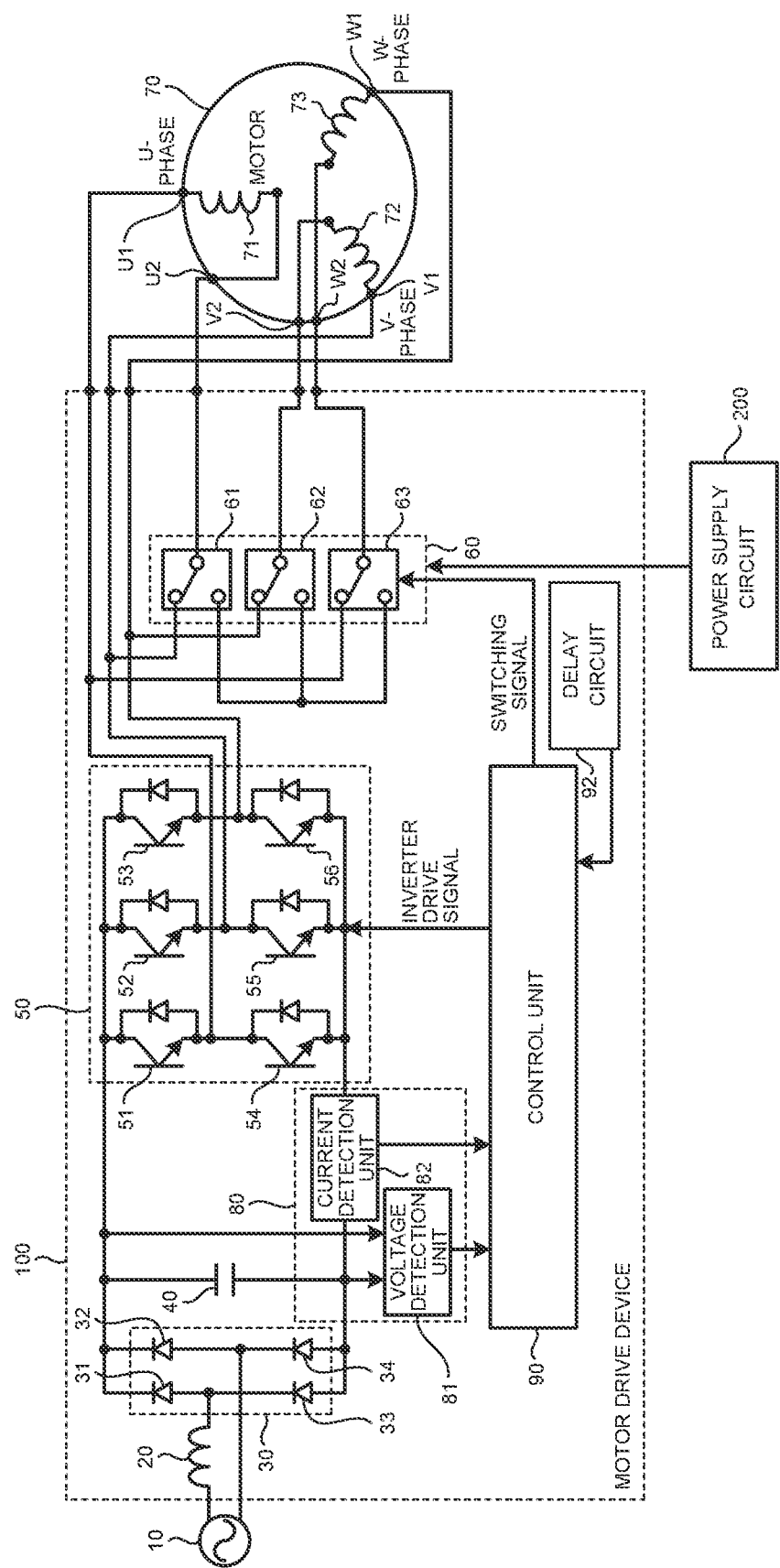
FIG. 2 is a diagram illustrating an example of a connection of the motor drive device and a motor when the connection state of the stator of the motor is a delta connection in the first embodiment.

FIG. 2 is a diagram illustrating an example of a connection of the motor drive device 100 and the motor 70 when the connection state of the stator of the motor 70 is the delta connection. In the state illustrated in FIG. 2, all of the relays 61, 62, and 63 are in the on state. At this time, the terminal U2 is connected to the midpoint of the V-phase arm, the terminal V2 is connected to the midpoint of the W-phase arm, the terminal W2 is connected to the midpoint of the U-phase arm, and the connection state of the stator of the motor 70 is the delta connection. Correspondences between the on state and the off state of the relays 61, 62, and 63 and the connection states are not limited to the above-described example. The star connection may be formed when the relays 61, 62, and 63 are in the on state, and the delta connection may be formed when the relays 61, 62, and 63 are in the off state. The star connection and the delta connection described above are an example of a plurality of connection states of the stator windings. The present invention is not limited to the above-described example, and can be applied to switching between a plurality of connection states.

Figure 3:
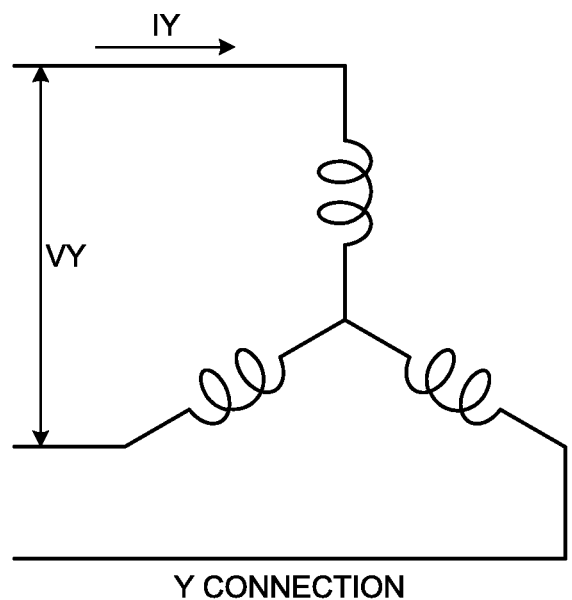
FIG. 3 is a connection diagram illustrating the winding state of a star connection of the motor according to the first embodiment.
Figure 4:
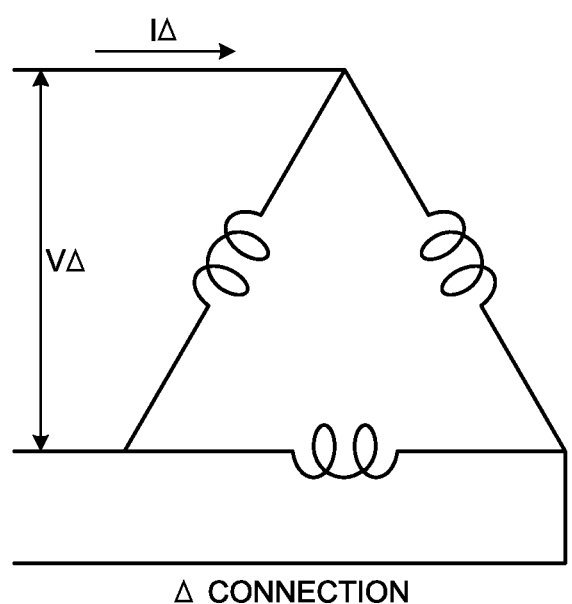
FIG. 4 is a connection diagram illustrating the winding state of the delta connection of the motor according to the first embodiment.

Next, the effect of switching the connection state of the motor 70 between the star connection and the delta connection will be described. FIG. 3 is a connection diagram illustrating the winding state of the star connection of the motor 70 according to the first embodiment. FIG. 4 is a connection diagram illustrating the winding state of the delta connection of the motor 70 according to the first embodiment. In FIGS. 3 and 4, the star connection is described as Y connection and the delta connection is described as Δ connection.

The control unit 90 of the present embodiment controls the switching unit 60 according to the number of revolutions. Specifically, for example, the control unit 90 generates a switching signal such that when the number of revolutions is equal to or lower than a predetermined value, the connection state of the motor 70 is the star connection, and when the number of revolutions exceeds the predetermined value, the connection state of the motor 70 is the delta connection. The number of revolutions may be indicated by an operation command or the like input from the outside to the motor drive device 100, or may be determined by the control unit 90 of the motor drive device 100. Although the control unit 90 switches the connection state according to the number of revolutions here, the control unit 90 may switch the connection state on the basis of other information. The control unit 90 may switch the connection state using both the number of revolutions and other information.

Relational expressions of $VY=\sqrt{3} \times V\Delta$ and $\sqrt{3} \times IY=I\Delta$ hold, where $VY$ is defined as the line voltage of the motor 70 in the state of the star connection, $IY$ is defined as current flowing through the motor 70 in the state of the star connection, $V\Delta$ is defined as the line voltage of the motor 70 in the state of the delta connection, and $I\Delta$ is defined as current flowing through the motor 70 in the state of the delta connection. This shows that the delta connection increases current by $\sqrt{3}$ times while it can reduce voltage required for driving by $1/\sqrt{3}$ times, compared to the star connection.

From the above relationships, by using the star connection in the low rpm region, the motor 70 can be operated with a current $1/\sqrt{3}$ times that of the delta connection, and the loss of the inverter 50 can be reduced. On the other hand, by using the delta connection with a smaller number of turns of the stator windings in the high rpm region, the motor 70 can be driven with an induced voltage $1/\sqrt{3}$ times that of the star connection. A method of reducing induced voltage in the high rpm region by reducing the magnetic forces of permanent magnets by flux-weakening control is possible. However, flux-weakening control needs the flow of more current and degrades efficiency. In contrast, by using the method of using the delta connection in the high rpm region, efficiency degradation due to the use of flux-weakening control is not introduced. By using the star connection in the low rpm region and using the delta connection in the high rpm region, increased efficiency can be achieved in the entire rpm region.

On the other hand, for example, when inexpensive relays are used for the plurality of relays 61, 62, and 63 constituting the switching unit 60, switching all of them simultaneously to the on state or the off state causes an overcurrent in the motor drive device 100. In general, power is supplied from a power supply circuit 200 to the control unit 90 and the switching unit 60 of the motor drive device 100. In this case, if an overcurrent is generated by switching all of the relays 61, 62, and 63 simultaneously to the on state or the off state, the regulation of the power supply circuit 200 may become unstable, that is, the output voltage of the power supply circuit 200 may vary. In particular, when a multi-output power supply circuit is used, generation of an overcurrent in a certain power supply line may cause variations in output voltage from the power supply circuit 200 in the other power supply lines via the windings of a transformer. Thus, for example, when the control unit 90 and the switching unit 60 are supplied with power from different power supply lines of the multi-output power supply circuit, an overcurrent generated in the switching unit 60 may cause a variation in the output voltage of a power supply line supplying power to the control unit 90 that is a different power supply line. For a home power supply circuit, a multi-output power supply circuit is often used. When the motor 70 and the motor drive device 100 are mounted in a home air conditioner, an overcurrent generated by switching all of the relays 61, 62, and 63 simultaneously to the on state or the off state may cause a variation in voltage supplied to the control unit 90.

Figure 5:
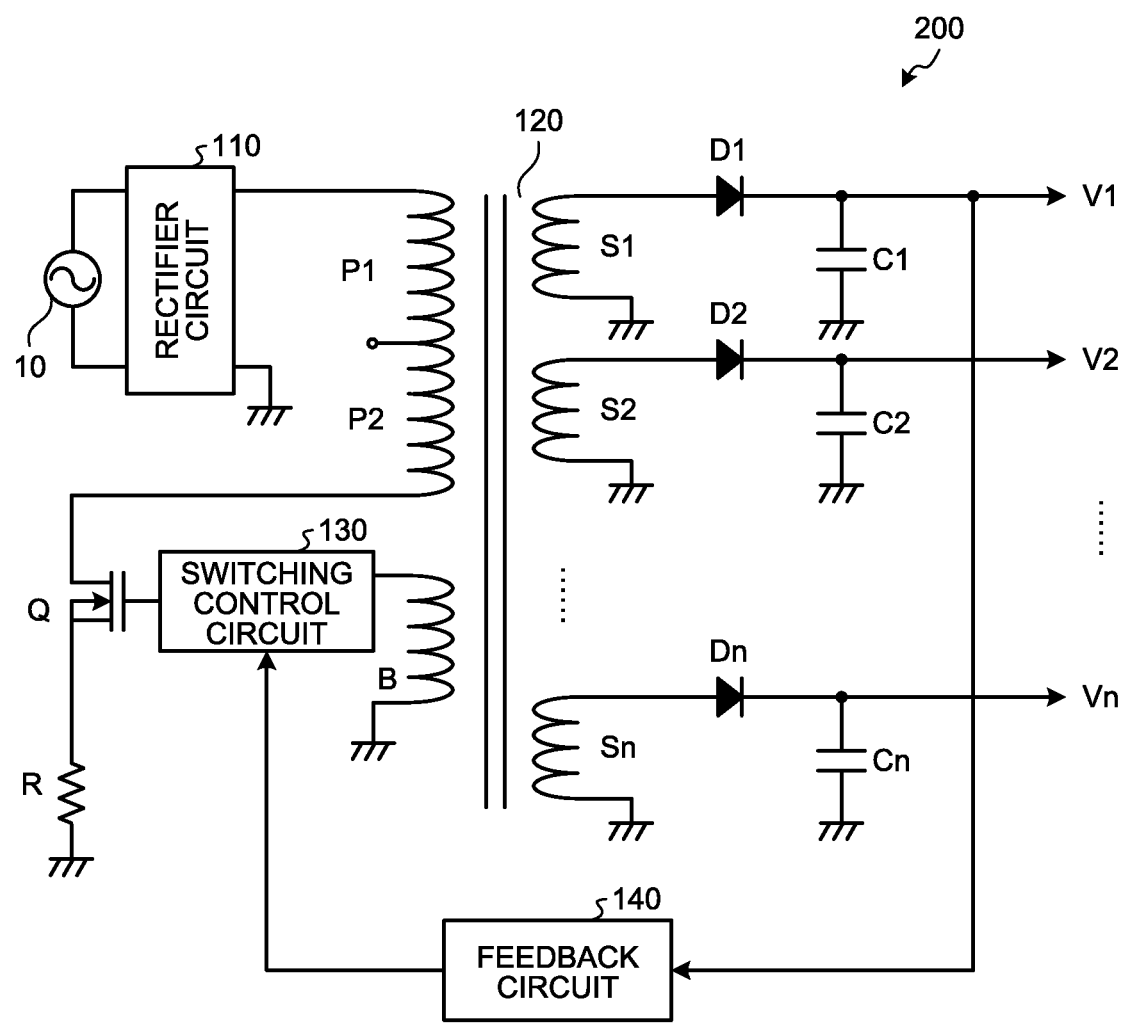
FIG. 5 is a diagram illustrating an example configuration of a multi-output power supply circuit in the first embodiment.

FIG. 5 is a diagram illustrating an example configuration of a multi-output power supply circuit. A power supply circuit 200 illustrated in FIG. 5 includes a rectifier circuit 110, a transformer 120, a switching control circuit 130, a switching element Q, a resistor R, a winding B, n (n is an integer of two or more) diodes D1, D2, . . . , Dn, and n capacitors C1, C2, . . . , Cn. The transformer 120 includes primary windings P1 and P2 and n secondary windings S1, S2, . . . , Sn. The rectifier circuit 110 converts AC power supplied from the AC power source 10 into DC power, and supplies the DC power to the transformer 120. The transformer 120 generates secondary voltages V1, V2, . . . , Vn in proportion to the turns ratios between the primary windings P1 and P2 and the secondary windings S1, S2, . . . , Sn, respectively, and outputs them from the primary windings P1 and P2 to the secondary windings S1, S2, . . . , Sn. The diodes D1, D2, . . . , Dn rectify the secondary voltages V1, V2, . . . , Vn, respectively. The capacitors C1, C2, . . . , Cn smooth the secondary voltages V1, V2, . . . , Vn, respectively. From the power supply circuit 200, the rectified and smoothed secondary voltages V1, V2, . . . , Vn are output through different power supply lines.

Some of the power supply lines of the secondary voltages V1, V2, . . . , Vn output from the power supply circuit 200 are connected to a feedback circuit 140, and send a feedback signal to the switching control circuit 130 via the feedback circuit 140. The switching control circuit 130 can control the secondary voltage of a power supply line connected to the feedback circuit 140 by adjusting the time ratio between an on state and an off state of the switching element Q, using a feedback signal, thereby controlling a primary current flowing through the resistor R and the winding B.

The secondary voltages of the power supply lines connected to the feedback circuit 140 can be controlled by the switching control circuit 130, but variations in the secondary voltages of the power supply lines not connected to the feedback circuit 140 cannot be controlled. Consequently, for example, when power is supplied to the switching unit 60 from a power supply line that is not connected to the feedback circuit 140, turning on all of the relays 61, 62, and 63 of the switching unit 60 simultaneously generates an overcurrent. This overcurrent can cause voltage drops in voltage generated using the same winding and the secondary voltage of a different power supply line. When power is supplied to the control unit 90 from the different power supply line of the power supply circuit 200, the above-described overcurrent can make the power supply to the control unit 90 unstable, causing reset in the control unit 90, which can cause a malfunction resulting in a failure of the apparatus or the like.

Here, the multi-output power supply circuit using the transformer has been described as an example. In a step-down or step-up power supply circuit using a switching regulator instead of a transformer, generation of an overcurrent can make the regulation unstable likewise.

When all of the relays 61, 62, and 63 are simultaneously switched to the off state or the on state, an overcurrent and an overvoltage may occur. Therefore, it may become necessary to increase the component ratings of the components constituting the motor drive device 100 according to the current and the voltage. In addition, a sharp change in current and voltage can be a cause of noise, and thus may require the addition of noise suppression elements or noise suppression circuits to the switching unit 60 and the components connected to the switching unit 60 illustrated in FIG. 1 and to the power supply circuit 200 illustrated in FIG. 5. In either case, disadvantages such as an increase in circuit size, an increase in component size, and an increase in cost may occur.

In the present embodiment, the control unit 90 shifts switching timings of the relays 61, 62, and 63 by controlling switching timings of the relays 61, 62, and 63, which are the plurality of switches, individually, to reduce an influence on the regulation of the power supply circuit 200 and prevent an increase in the ratings of the components, an increase in circuit size, and an increase in cost.

Figure 6:
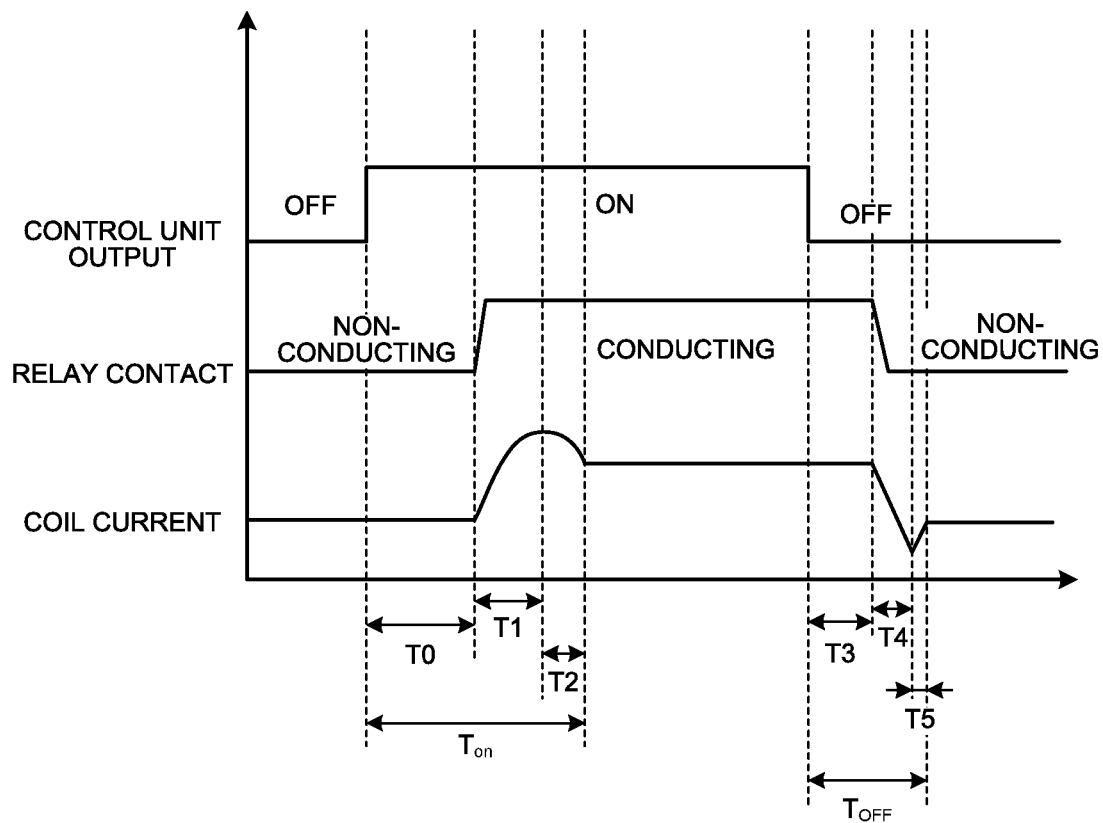
FIG. 6 is a diagram illustrating an example of a timing chart when a control unit controls a switching unit in the first embodiment.

FIG. 6 is a diagram illustrating an example of a timing chart when the control unit 90 of the present embodiment controls the switching unit 60. The first stage of FIG. 6 illustrates a switching signal that is a signal output from the control unit 90, the second stage illustrates the state of the contact of a relay of the switching unit 60, and the third stage illustrates a coil current that is a current flowing through the stator windings of the motor 70. As will be described later, at least one of the relays 61, 62, and 63 constituting the switching unit 60 is shifted in switching timing at which the state of the contact is switched from the off state to the on state. The relay whose contact state is illustrated in the second stage of FIG. 6 is a relay that is switched first among the relays 61, 62, and 63 constituting the switching unit 60. Details of the switching timings of the relays 61, 62, and 63 will be described later.

When a condition of switching the winding state is satisfied, the control unit 90 determines that the connection state of the motor 70 will be changed and controls the switching unit 60 by switching signals. The condition of switching the winding state is determined according to the number of revolutions, for example, as described above, but the condition of switching the winding state is not limited to this example. The example illustrated in FIG. 6 shows that when the switching signal is at a low level, the relays of the switching unit 60 are in the off state, that is, the nonconducting state, and when the switching signal is at a high level, the relays of the switching unit 60 are in the on state, that is, the conducting state. In the present embodiment, the switching signal is generated for each relay of the switching unit 60.

As illustrated in the first and second stages of FIG. 6, when the switching signal changes from the low level to the high level, the state of the contact of the relay of the switching unit 60 changes from the nonconducting state to the conducting state after a delay time T0. As illustrated in the third stage of FIG. 6, when the delay time T0 has elapsed since the switching signal changed from the low level to the high level, the coil current starts to increase. When a time T1 has elapsed since the start of the increase, the coil current becomes the largest, and then the coil current starts to decrease. When a time T2 has elapsed since the coil current became the largest, the coil current falls within a certain range, and the coil current becomes stable.

After that, as illustrated in the first and second stages of FIG. 6, when the switching signal changes from the high level to the low level, the state of the contact of the relay of the switching unit 60 changes from the conducting state to the nonconducting state after a delay time T3. In FIG. 6, the horizontal axis indicates time. As illustrated in the third stage of FIG. 6, when the delay time T3 has elapsed since the switching signal changed from the high level to the low level, the coil current starts to decrease. When a time T4 has elapsed since the start of the decrease, the coil current becomes the smallest, and then the coil current starts to increase. When a time T5 has elapsed since the coil current became the smallest, the coil current falls within a certain range, and the coil current becomes stable.

Thus, $T_{on}$ that is a time from the timing when the control unit 90 issues an instruction to switch from the off state to the on state by the switching signal, that is, the timing when the switching signal changes from the low level to the high level until the relay is turned on and the coil current becomes stable is a value obtained by adding T0, T1, and T2 together. $T_{off}$ that is a time from the timing when the control unit 90 issues an instruction to switch from the on state to the off state by the switching signal, that is, the timing when the switching signal changes from the high level to the low level until the relay is turned off and the coil current becomes stable is a value obtained by adding T3, T4, and T5 together.

An element such as a noise filter or a delay circuit 92 may be added between the control unit 90 and the switching unit 60 or upstream or downstream of the control unit 90 and the switching unit 60. Needless to say, when an element, a circuit, an internal control circuit, or the like that causes a delay time in signal transmission is added, the corresponding delay time is added to at least one of $T_{on}$ and $T_{off}$.

Figure 7:
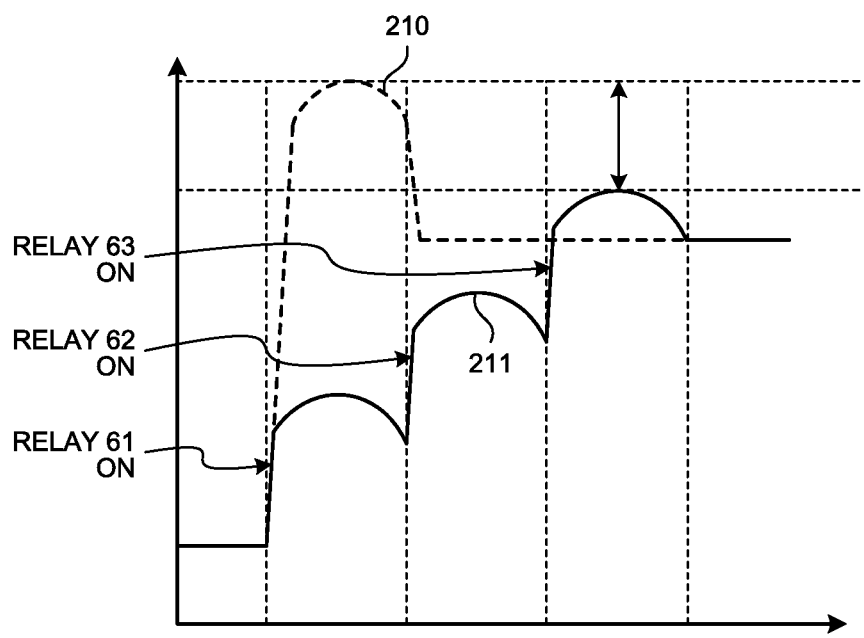
FIG. 7 is a diagram illustrating an example of switching timings of relays that constitute the switching unit in the first embodiment.

FIG. 7 is a diagram illustrating an example of switching timings of the relays 61, 62, and 63 that constitute the switching unit 60 of the present embodiment. In FIG. 7, the horizontal axis indicates time. In the example illustrated in FIG. 7, the control unit 90 generates switching signals to change the relay 61, the relay 62, and the relay 63 from the off state to the on state, individually, in this order. A current 211 illustrated in FIG. 7 represents a power supply current that is a current flowing from the switching unit 60 to the power supply circuit 200. The current 211 increases at the timing when the relay 61 is turned on, at the timing when the relay 62 is turned on, and at the timing when the relay 63 is turned on, and decreases after each increase. On the other hand, a comparative example 210 indicated by a broken line shows an example in which all of the relays 61, 62, and 63 are simultaneously switched from the off state to the on state. When all of the relays 61, 62, and 63 are simultaneously switched from the off state to the on state, the current sharply increases as in the comparative example 210. Shifting the switching timings of the relay 61, the relay 62, and the relay 63 can provide an effect of preventing a sharp increase in power supply current as shown by the current 211. Note that the order of switching the relays 61, 62, and 63 is not limited to the example illustrated in FIG. 7, and may be a different order such as the order the relay 63, the relay 62, and the relay 61.

Figure 8:
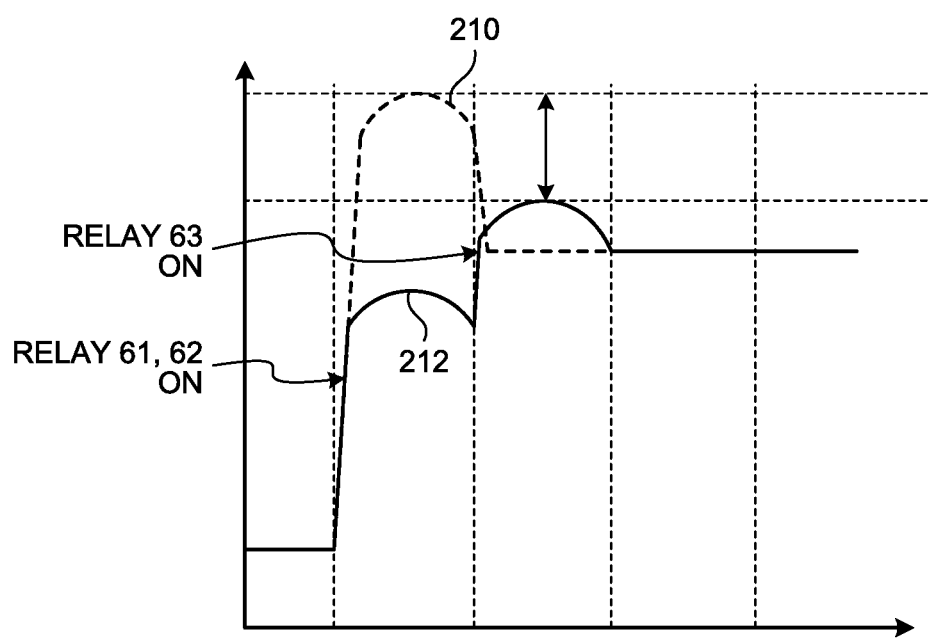
FIG. 8 is a diagram illustrating another example of switching timings of the relays that constitute the switching unit in the first embodiment.

FIG. 8 is a diagram illustrating another example of switching timings of the relays 61, 62, and 63 that constitute the switching unit 60 of the present embodiment. A current 212 illustrated in FIG. 8 represents a power supply current when two of the relays 61, 62, and 63, or the relay 61 and the relay 62, are simultaneously switched from the off state to the on state, and the switching timing of the relay 63 is shifted from the switching timing of the relay 61 and the relay 62. Even when the switching timing of one of the three relays is shifted in this manner, the effect of preventing a sharp increase in the current 212 can be obtained as in the example illustrated in FIG. 7.

As above, the timing at which at least one of the plurality of switches switches from the first state to the second state is different from the timing at which the other switches switch from the first state to the second state. In the present embodiment, the plurality of switches are the relays 61, 62, and 63, the first state is a non-energized state, and the second state is an energized state. In the example illustrated in FIG. 7, the timings at which the plurality of switches switch from the first state to the second state do not coincide with each other. In the example illustrated in FIG. 8, two of the plurality of switches switch from the first state to the second state at the same timing.

To generate switching signals with different switching timings as illustrated in FIGS. 7 and 8, a delay circuit 92 may be used. For example, to perform the operation illustrated in FIG. 7, the control unit 90 generates a switching signal for the relay 61, and outputs the generated switching signal to the relay 61 and also to the delay circuit 92. The delay circuit 92 delays the timing of changing from the low level to the high level, and outputs the delayed switching signal to the relay 62. Further, the delayed switching signal is input to the delay circuit 92 again, and the delayed switching signal is output to the relay 63. That is, the motor drive device 100 may include a delay circuit 92, the relays 61, 62, and 63 may be controlled using a plurality of switching signals corresponding one-to-one with them, the control unit 90 may generate one switching signal of the plurality of switching signals, and the other switching signals may be generated by adding delay to the one switching signal by the delay circuit 92.

As the rectifier elements 31 to 34, diodes or the like are typically used. Alternatively, for example, Metal Oxide Semiconductor Field Effect Transistors (MOSFETs) or the like may be used for rectification by turning them on in accordance with the polarity of the AC power source 10.

For the switching elements 51 to 56, a combination of an Insulated Gate Bipolar Transistor (IGBT) or a MOSFET and a freewheeling diode connected in parallel therewith, or the like may be used. The switching elements 51 to 56 are not limited to them, and anything that can perform switching may be used for the switching elements 51 to 56. When a MOSFET is used, it has a parasitic diode for structural reasons, and thus can provide a similar effect without a freewheeling diode being connected in parallel purposely.

For a material for forming at least one of the rectifier elements 31 to 34 and the switching elements 51 to 56, silicon (Si) can be used. At least one of the rectifier elements 31 to 34 and the switching elements 51 to 56 may be formed of a wide-bandgap semiconductor. By at least one of the rectifier elements 31 to 34 and the switching elements 51 to 56 being formed of a material using silicon carbide (SiC), gallium nitride (GaN), diamond, or the like, which is a wide-bandgap semiconductor, loss can be reduced more.

Further, as described above, the switching unit 60 may use any method as long as it can switch the winding state of the motor 70. For example, a make contact relay and a break contact relay may be combined to implement the same operation as the relays 61, 62, and 63 illustrated in FIG. 1. The switching unit 60 is not limited to relays. The switching unit 60 may be composed of electromagnetic contactors such as contactors, switching elements formed of semiconductors, etc. The switching unit 60 may be composed of any component as long as it can switch the windings of the motor 70. When switching elements are used, for example, one switch is composed of a first switching element and a second switching element. By switching between a first state in which the first switching element is in an on state and the second switching element is in an off state and a second state in which the second switching element is in an on state and the first switching element is in an off state, the connection state of the stator windings 71, 72, and 73 is switched. However, when the switching unit 60 is formed using semiconductors, conduction loss occurs when they are turned on. Thus, using mechanical relays or the like can reduce conduction loss, and can provide the motor drive device 100 that is more efficient than when semiconductors are used.

It goes without saying that the voltage detection unit 81 and the current detection unit 82 may be provided, instead of the position illustrated in FIG. 1, in any position that allows detection of information necessary for the control unit 90 to operate. For example, for the voltage detection unit 81, voltage may be divided by a resistor provided in parallel with the capacitor 40 so that the divided voltage is detected. Thus, voltage may be changed to a voltage of, for example, 5 V or lower that can be detected by a microcomputer or the like, for detection. The current detection unit 82 in the position illustrated in FIG. 1 may be alternatively implemented by a sensor for detecting current being mounted between the inverter 50 and the motor 70.

The control unit 90 can be formed by a discrete system such as a Central Processing Unit (CPU), a Digital Signal Processor (DSP), or a microcomputer, and may alternatively be formed by an electric circuit element such as an analog circuit or a digital circuit. That is, the control unit 90 is implemented by a processing circuit. The processing circuit may be dedicated hardware or a processing circuit including a processor such as a CPU.

Figure 9:
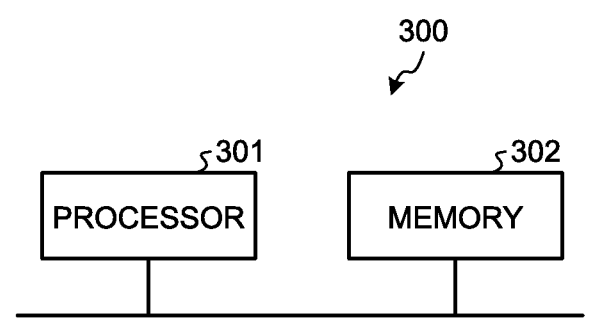
FIG. 9 is a diagram illustrating an example configuration of a processing circuit including a processor in the first embodiment.

FIG. 9 is a diagram illustrating an example configuration of a processing circuit including a processor. FIG. 9 illustrates an example configuration of a processing circuit when the processing circuit implementing the control unit 90 is a processing circuit including a processor. A processing circuit 300 illustrated in FIG. 9 includes a processor 301 such as a CPU and memory 302. The memory 302 corresponds, for example, to nonvolatile or volatile semiconductor memory such as Random Access Memory (RAM), Read Only Memory (ROM), or a flash memory.

When the control unit 90 is implemented by the processing circuit 300 illustrated in FIG. 9, the functions of the control unit 90 are implemented by the processor 301 executing programs for implementing the functions implementing the control unit 90. The memory 302 is also used as a storage area when the processor 301 executes the programs. Part of the control unit 90 may be implemented by a processing circuit that is dedicated hardware, and the remaining part may be implemented by the processing circuit 300 illustrated in FIG. 9 described above.

When the present embodiment is applied to an air conditioner, operation in the low rpm region that is frequently used is performed with the star connection, and operation in the high rpm region is performed with the delta connection. As described above, in the present embodiment, when the states of the contacts of the relays 61, 62, and 63 are switched from the off state to the on state to switch the connection state of the motor 70, the switching timings of the relays 61, 62, and 63, which are the plurality of switches constituting the switching unit 60, are controlled individually to make the switching timing of at least one of the plurality of switches different from the switching timing of the other switches, so that variations in current occurring at the time of switching of the connection state of the motor 70 can be reduced. This can stabilize the regulation of the power supply circuit 200, and can provide the motor drive device 100 of high reliability.

Second Embodiment

Next, the operation of the motor drive device 100 according to a second embodiment of the present invention will be described. The configurations of the motor drive device 100 and the motor 70 of the present embodiment are the same as those of the first embodiment. Hereinafter, differences from the first embodiment will be described without duplicated explanation of the first embodiment.

The first embodiment has described the example in which, for the switching timings to change the relays 61, 62, and 63, which are the plurality of switches constituting the switching unit 60, from the off state to the on state, the switching timing of at least one of the relays 61, 62, and 63 is made different from that of the other relays, thereby reducing variations in current.

Figure 10:
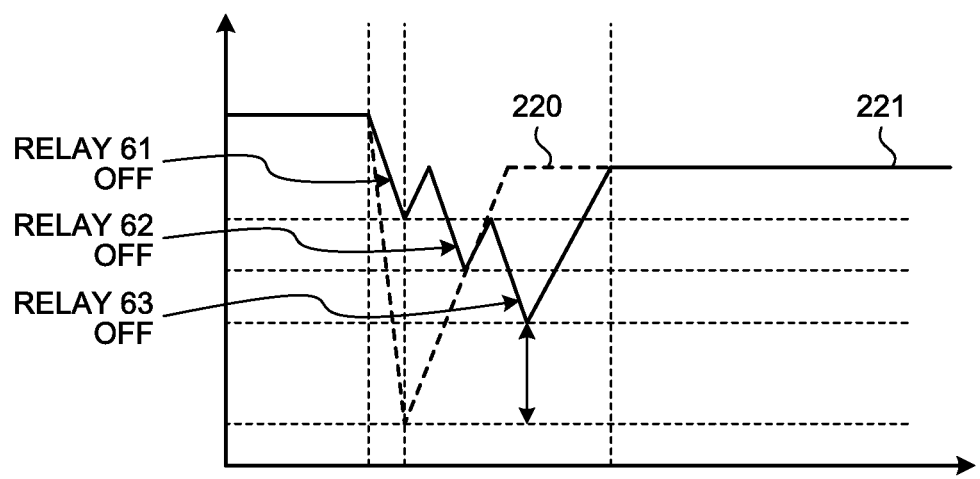
FIG. 10 is a diagram illustrating an example of switching timings of the relays that constitute the switching unit in a second embodiment.

FIG. 10 is a diagram illustrating an example of switching timings of the relays 61, 62, and 63 that constitute the switching unit 60 of the present embodiment. In FIG. 10, the horizontal axis indicates time. In the example illustrated in FIG. 10, the control unit 90 generates switching signals to change the relay 61, the relay 62, and the relay 63 from the on state to the off state, individually, in this order. A current 221 illustrated in FIG. 10 represents a power supply current that is a current flowing from the switching unit 60 to the power supply circuit. The current 221 decreases at the timing when the relay 61 is turned off, at the timing when the relay 62 is turned off, and at the timing when the relay 63 is turned off, and increases after each decrease.

On the other hand, a comparative example 220 indicated by a broken line represents a power supply current when all of the relays 61, 62, and 63 are simultaneously switched from the on state to the off state. When all of the relays 61, 62, and 63 are simultaneously switched from the on state to the off state, the current changes sharply as in the comparative example 220. This can destabilize the regulation in the other secondary power supply lines via the transformer of the power supply circuit. By shifting the switching timings of the relay 61, the relay 62, and the relay 63, as shown by the current 221, a sharp change in the power supply current can be prevented. Note that the order of switching the relays 61, 62, and 63 is not limited to the example illustrated in FIG. 10, and may be a different order such as the order the relay 63, the relay 62, and the relay 61.

Figure 11:
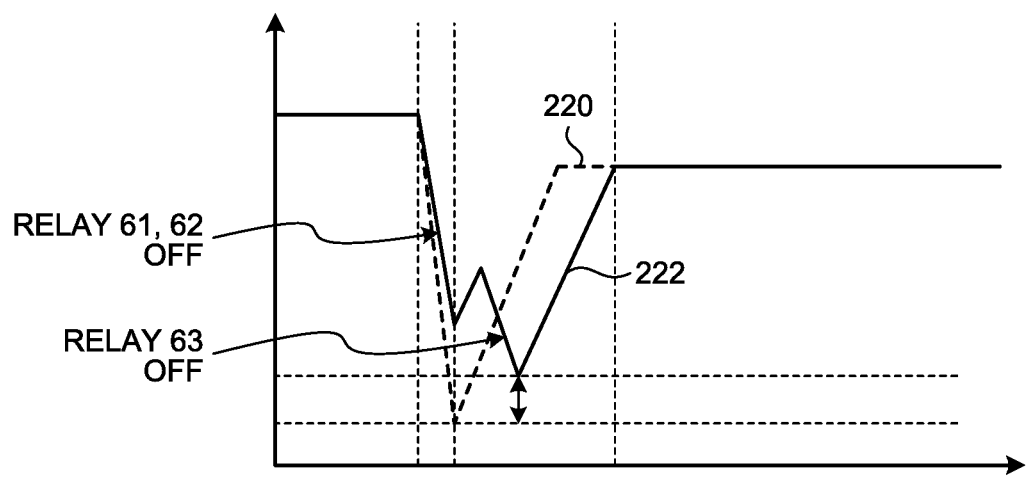
FIG. 11 is a diagram illustrating another example of switching timings of the relays that constitute the switching unit in the second embodiment.

FIG. 11 is a diagram illustrating another example of switching timings of the relays 61, 62, and 63 that constitute the switching unit 60 of the present embodiment. A current 222 illustrated in FIG. 11 represents a power supply current when two of the relays 61, 62, and 63, or the relay 61 and the relay 62, are simultaneously switched from the on state to the off state, and the switching timing of the relay 63 is shifted from the switching timing of the relay 61 and the relay 62. Even when the switching timing of one of the three relays is shifted in this manner, the effect of preventing a sharp variation in the power supply current can be obtained as shown by the current 222, as in the example illustrated in FIG. 10.

In the present embodiment, when the states of the contacts of the relays 61, 62, and 63 are switched from the on state to the off state to switch the connection state of the motor 70, the switching timings of the relays 61, 62, and 63, which are the plurality of switches constituting the switching unit 60, are controlled individually to make the switching timing of at least one of the plurality of switches different from the switching timing of the other switches, so that variations in current occurring at the time of switching of the connection state of the motor 70 can be reduced. This can stabilize the regulation of the power supply circuit, and can provide the motor drive device 100 of high reliability.

Although by performing either the shift of the switching timings at which the state of the contact is switched from the off state to the on state described in the first embodiment or the shift of the switching timings at which the state of the contact is switched from the on state to the off state described in the second embodiment, variations in current occurring at the time of switching of the connection state of the motor 70 can be reduced, both may be performed.

Specifically, the plurality of switches are relays, and as described in the first embodiment, the timing at which at least one of the plurality of switches switches from the first state to the second state is different from the timing at which the other switches switch from the first state to the second state. When the first state is a non-energized state and the second state is an energized state, the timing at which at least one of the plurality of switches switches from the second state to the first state may be different from the timing at which the other switches switch from the second state to the first state.

Alternatively, the plurality of switches are relays, and as described in the first embodiment, the timing at which at least one of the plurality of switches switches from the first state to the second state is different from the timing at which the other switches switch from the first state to the second state, and the first state may be an energized state and the second state may be a non-energized state.

Third Embodiment

Figure 12:
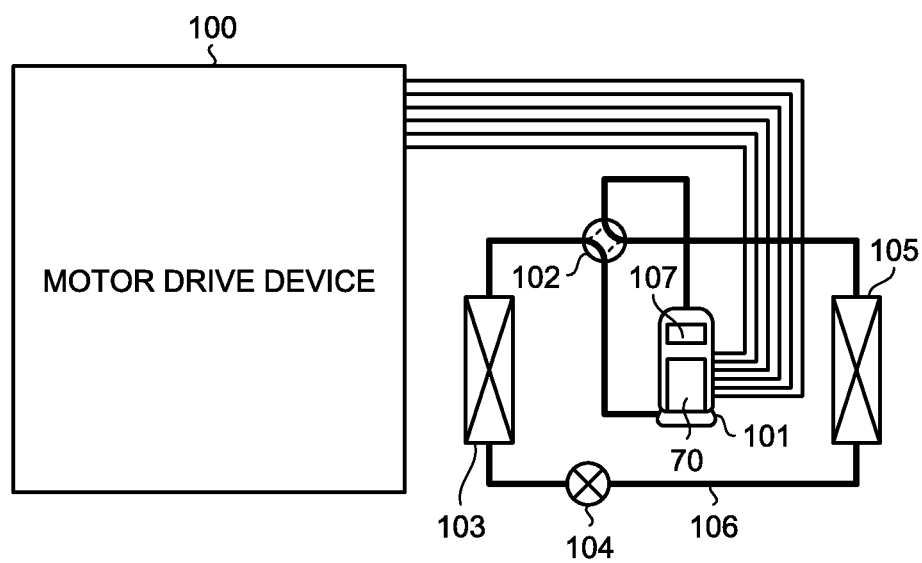
FIG. 12 is a diagram illustrating an example configuration of an air conditioner in a third embodiment.

FIG. 12 is a diagram illustrating an example configuration of an air conditioner in a third embodiment of the present invention. The air conditioner of the present embodiment includes the motor drive device 100 described in the first embodiment. The air conditioner of the present embodiment has a refrigeration cycle with a compressor 101 containing the motor 70 of the first embodiment, a four-way valve 102, an outdoor heat exchanger 103, an expansion valve 104, and an indoor heat exchanger 105 installed via refrigerant piping 106, constituting a split-type air conditioner. Note that the air conditioner of the present embodiment may include the motor drive device 100 described in the second embodiment instead of the motor drive device 100 described in the first embodiment.

In the compressor 101, a compression mechanism 107 for compressing a refrigerant and the motor 70 for driving the compression mechanism 107 are provided. The refrigerant circulates from the compressor 101 between the outdoor heat exchanger 103 and the indoor heat exchanger 105, thereby forming the refrigeration cycle for performing cooling, heating, etc. Note that the configuration illustrated in FIG. 12 is applicable not only to an air conditioner but also to a refrigeration cycle apparatus having a refrigeration cycle such as a refrigerator or a freezer.

The configurations described in the above embodiments illustrate examples of the subject matter of the present invention, and can be combined with another known art, and can be partly omitted or changed without departing from the scope of the present invention.

The invention claimed is:

1. A motor drive device connected to a multi-output power supply circuit comprising a feedback circuit to reduce voltage variation in direct-current power to be supplied, the motor drive device comprising:
    an inverter to apply power to a motor; and
    a plurality of switches to switch a connection state of the motor by each switching a state thereof between a first state and a second state, wherein
    when direct-current power is supplied to the plurality of switches from a power supply line not connected to the feedback circuit of power supply lines of the multi-output power supply circuit, a timing at which at least one of the plurality of switches switches from the first state to the second state is different from a timing at which another of the plurality of switches switches from the first state to the second state.

2. The motor drive device according to claim 1, wherein the plurality of switches are connected to different phases of the inverter, and timings at which the plurality of switches switch from the first state to the second state do not coincide with each other.

3. The motor drive device according to claim 1, wherein the plurality of switches are connected to different phases of the inverter, and two of the plurality of switches switch from the first state to the second state at a same timing.

4. The motor drive device according to claim 1, further comprising a controller to control switching of the states of the plurality of switches.

5. The motor drive device according to claim 4, further comprising a delay circuit, wherein
    the plurality of switches are controlled using a plurality of switching signals corresponding one-to-one with the plurality of switches, and
    the controller generates one of the plurality of switching signals, and another of the plurality of switching signals is generated by the delay circuit adding delay to the one of the plurality of switching signals.

6. The motor drive device according to claim 1, wherein the inverter comprises a plurality of switching elements, and
    at least one of the plurality of switching elements is formed of a wide-bandgap semiconductor.

7. The motor drive device according to claim 1, wherein each of the plurality of switches is a relay, and
    the first state is a non-energized state and the second state is an energized state.

8. The motor drive device according to claim 7, wherein a timing at which at least one of the plurality of switches switches from the second state to the first state is different from a timing at which another of the plurality of switches switches from the second state to the first state.

9. The motor drive device according to claim 1, wherein each of the plurality of switches is a relay, and
    the first state is an energized state and the second state is a non-energized state.

10. An air conditioner comprising:
    the motor drive device according to claim 1; and
    a motor to be driven by the motor drive device.

* * * * *